US012513120B2

(12) United States Patent
Chiang et al.

(10) Patent No.: US 12,513,120 B2
(45) Date of Patent: Dec. 30, 2025

(54) METHOD AND SYSTEM OF PROVIDING SECURITY FOR ANONYMOUS AUTODISCOVER SERVICES

(71) Applicant: Microsoft Technology Licensing, LLC, Redmond, WA (US)

(72) Inventors: Dean Shiyu Chiang, Bellevue, WA (US); Deepak Kumar Singh, Lynwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 18/258,998

(22) PCT Filed: Dec. 15, 2021

(86) PCT No.: PCT/US2021/063426
§ 371 (c)(1),
(2) Date: Jun. 22, 2023

(87) PCT Pub. No.: WO2022/140120
PCT Pub. Date: Jun. 30, 2022

(65) Prior Publication Data
US 2024/0305611 A1    Sep. 12, 2024

(30) Foreign Application Priority Data

Dec. 22, 2020 (NL) ...................................... 2027203

(51) Int. Cl.
*H04L 9/40* (2022.01)
*H04L 51/212* (2022.01)
(52) U.S. Cl.
CPC ........ *H04L 63/0421* (2013.01); *H04L 51/212* (2022.05)

(58) Field of Classification Search
CPC . H04L 63/0421; H04L 51/212; H04L 63/102; G06F 16/95
See application file for complete search history.

(56) References Cited

U.S. PATENT DOCUMENTS 7,016,909 B2  3/2006  Kiilerich et al.
8,527,631 B1  9/2013  Liang
(Continued)

FOREIGN PATENT DOCUMENTS

WO   2014100244 A1   6/2014

OTHER PUBLICATIONS

Davis, et al., "Client Access Rules in Exchange Online", Retrieved From: https://learn.microsoft.com/en-us/exchange/clients-and-mobile-in-exchange-online/client-access-rules/client-access-rules, Sep. 23, 2020, 5 Pages.

(Continued)

*Primary Examiner* — Kenneth W Chang
(74) *Attorney, Agent, or Firm* — Novo TechIP International PLLC

(57) ABSTRACT

A method and system for securing an anonymous discovery service may include receiving a request from a client device, the request being directed to an anonymous Autodiscover service, identifying a source from which the request originated from within the client device, and responsive to the source being of a first type of sources, transmitting a first response to the client and responsive to the source being of a second type of sources transmitting a second response to the client. The first response does not return a Uniform Resource Locator (URL) to a service endpoint, the second response returns a URL to a service endpoint. Furthermore, the anonymous discovery service may be a discovery service that requires no authentication.

18 Claims, 4 Drawing Sheets

(56) References Cited

U.S. PATENT DOCUMENTS

| | | | |
|---|---|---|---|
| 8,863,248 B2 | 10/2014 | Wendt et al. | |
| 9,264,429 B2 | 2/2016 | Harris et al. | |
| 9,419,959 B2 | 8/2016 | Sanso et al. | |
| 9,690,920 B2 | 6/2017 | Marcus et al. | |
| 9,906,578 B2 | 2/2018 | Aliminati | |
| 10,075,417 B2 | 9/2018 | Baughman et al. | |
| 10,659,487 B2 | 5/2020 | Lowry et al. | |
| 2001/0028470 A1* | 10/2001 | Tuli | H04N 7/17318 348/E7.071 |
| 2005/0273849 A1 | 12/2005 | Araujo et al. | |
| 2006/0123464 A1* | 6/2006 | Goodman | H04L 63/1466 726/2 |
| 2007/0288746 A1* | 12/2007 | Jones | H04L 63/12 713/156 |
| 2011/0295645 A1* | 12/2011 | Barros | G06Q 10/06316 709/227 |
| 2014/0189808 A1* | 7/2014 | Mahaffey | G06F 21/6245 726/4 |
| 2020/0236102 A1 | 7/2020 | Azulay et al. | |

OTHER PUBLICATIONS

"Search Report and Written Opinion Issued in Netherlands Patent Application No. N2027203", Mailed Date: Sep. 22, 2021, 10 Pages.

Palet, et al., "Evaluation of v6ops Auto-discovery for Tunneling Mechanisms; draft-palet-v6ops-tun-auto-disc-00.txt", Retrieved from: http://www.consulintel.euro6ix.org/ietf/draft-palet-v6ops-tun-auto-disc-00.txt, Apr. 15, 2004, 21 Pages.

Patil, et al., "Turn Server Auto Discovery; draft-ietf-tram-turn-server-discovery-12", In Internet Engineering Task Force, Standardworkingdraft, Internet Society, Jan. 12, 2017, 16 Pages.

"International Search Report and Written Opinion Issued in PCT Application No. PCT/US21/063426", Mailed Date: Mar. 21, 2022, 12 Pages.

\* cited by examiner

METHOD AND SYSTEM OF PROVIDING SECURITY FOR ANONYMOUS AUTODISCOVER SERVICES

TECHNICAL FIELD

This disclosure relates generally to providing secure Autodiscover services, and, more particularly, to curtailing potential exploitation of anonymous Autodiscover services.

BACKGROUND

Electronic messaging systems are often used in enterprises to perform a variety of functions. For example, in addition to providing for the exchange of messages, some messaging systems offer calendar management, meeting scheduling, forms routing and/or project management. Numerous different messaging systems are provided by different vendors to offer such services (e.g., Microsoft® Exchange and Apple® Mail). Further, many applications have been developed that operate with these systems. The various applications and services are often provided by different servers. Because of this, clients usually need to know which servers to use for various services. In order to achieve this or to communicate with other clients, a client may first need to be configured with information about the servers or may need to be pointed in the right location for accessing a service.

While configuration information may be provided manually, the process can be expedited by offering an endpoint discovery service. To this end, many messaging systems offer an Autodiscover service that provides configuration information and as such helps configure user profile settings for clients. The Autodiscover service may use information received in a request from a client, as well as other parameters to identify the best servers for offering services requested by the client. Once the most appropriate servers are detected, the Autodiscover service may send a response to the client to provide configuration settings and/or information about the server endpoint offering the required services.

To ensure security, the Autodiscover server often requires client authentication before providing configuration settings and/or information about server endpoints. However, to provide more efficient on-premise Autodiscover services, some recent Autodiscover servers provide anonymous Autodiscover services. While this provides an efficient mechanism for providing on-premise Autodiscover services, the anonymous Autodiscover service may be exploited by malicious entities for phishing and other security breaches.

Hence, there is a need for improved systems and methods of ensuring security for anonymous Autodiscover services.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request from a client device, the request being directed to an anonymous discovery service and the anonymous discovery service being a service that requires no authentication, identifying a source from which the request originated from within the client device, and responsive to the source being of a first type of sources, transmitting a first response to the client and responsive to the source being of a second type of sources transmitting a second response to the client. In some implementations, the first response does not return a Uniform Resource Locator, URL, to a service endpoint, and the second response returns a URL to a service endpoint.

In yet another general aspect, the instant disclosure describes a method for securing an anonymous discovery service. The method may include receiving a request from a client device, the request being directed to the anonymous discovery service and the anonymous discovery service being a service that requires no authentication, identifying a source from which the request originated from within the client device, and responsive to the source being of a first type of sources, transmitting a first response to the client and responsive to the source being of a second type of sources transmitting a second response to the client. In some implementations, the first response does not return a Uniform Resource Locator, URL, to a service endpoint, and the second response returns a URL to a service endpoint.

In a further general aspect, the instant disclosure describes a non-transitory computer readable medium on which are stored instructions that when executed cause a programmable device to receive a request from a client device, the request being directed to the anonymous discovery service and the anonymous discovery service being a service that requires no authentication, identify a source from which the request originated from within the client device, and responsive to the source being of a first type of sources, transmit a first response to the client and responsive to the source being of a second type of sources transmitting a second response to the client. In some implementations, the first response does not return a Uniform Resource Locator, URL, to a service endpoint, and the second response returns a URL to a service endpoint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
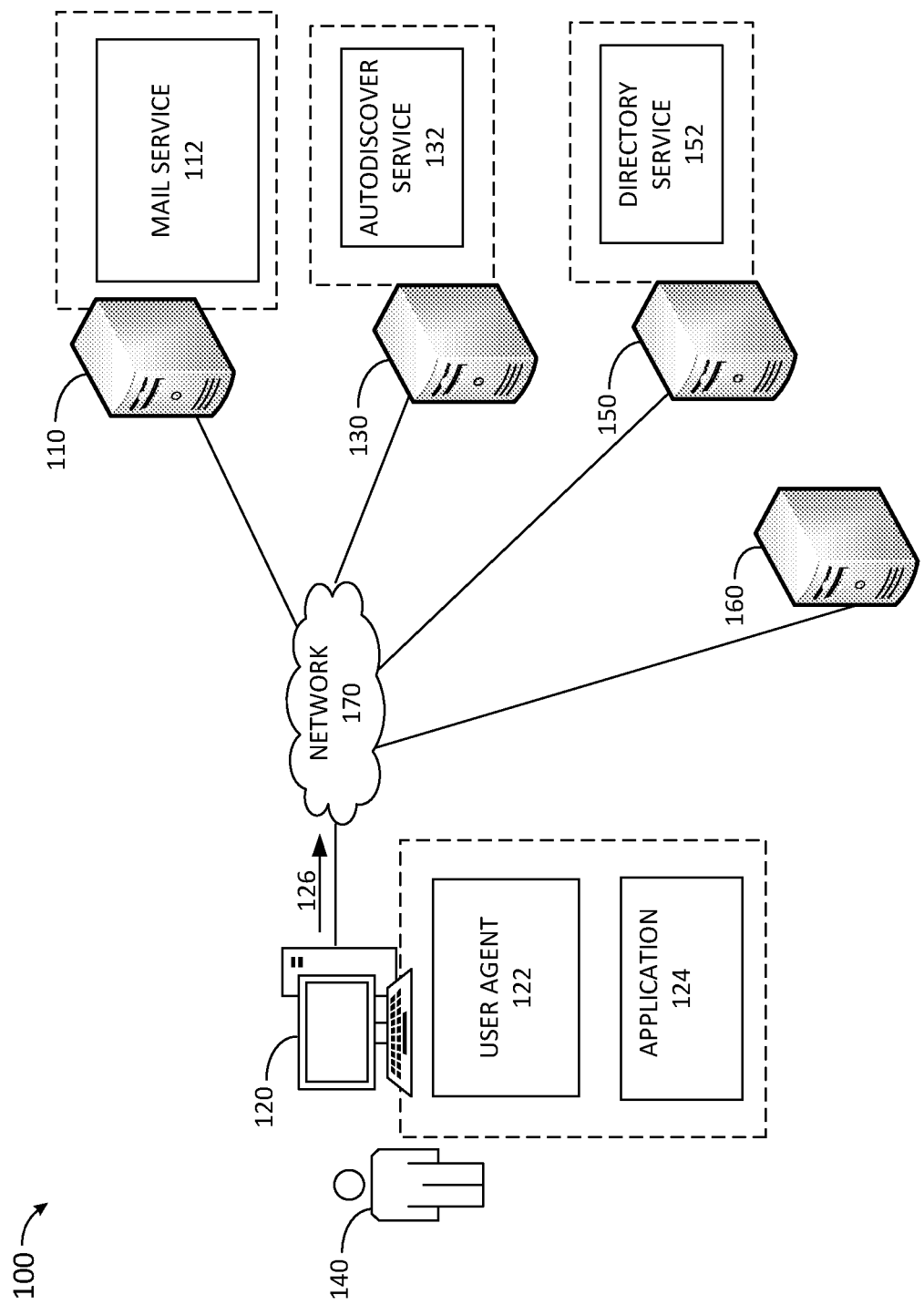
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Autodiscover services are discovery services used by many electronic messaging systems (e.g., email providers) for minimizing the configuration and deployment steps required for providing access to various email-related services. For example, the Autodiscover service may be used to establish an initial connection to a user's mailbox. Once the connection is established, the Autodiscover service may also be used to provide access to other services. This may be done by providing the endpoint Uniform Resource Locator (URL) for those services.

To ensure security, Autodiscover services typically require authentication before providing services to a client. However, some recent Autodiscover servers provide anonymous Autodiscover services that do not require client authentication. While this may provide some advantages for on-premise system installations, it can lead to a security loophole in the system that can be exploited by malicious entities. For example, a malicious entity may create a domain having a trusted hostname (e.g., autodiscover.example.com), upload malicious web scripts on the domain, and include a URL to the domain as a hyperlink in an email to a user. The user may verify that the hostname is a known trusted entity and as such click on the hyperlink. This may lead to the user's default browser sending an Autodiscover request to the Autodiscover service. Without authentication, this may result in the Autodiscover service returning a redirection to the malicious domain endpoint. Thus, there exists the technical problem of systems unknowingly redirecting a client to a malicious domain endpoint.

In another example, a malicious entity may exploit the Autodiscover service to identify valid email addresses of an organization by sending Autodiscover requests based on different email addresses until they receive a valid Simple Mail Transfer Protocol (SMTP) address for an email address they tested. This is because, unlike traditional Autodiscover services which require a username and password, an anonymous Autodiscover service may only require an email address. As a result, the malicious entity may submit requests for various email addresses until it receives a valid SMTP address, at which point it can identify the email address for which they received an SMTP address as a valid email address. Thus, currently available anonymous Autodiscover services suffer from the technical problem of failing to protect against phishing and other malicious attempts at exploiting the service. As a result, malicious entities may gain access to confidential information and/or other useful information which can be exploited.

To address these technical problems and more, in an example, this description provides a technical solution used for increasing security of an anonymous Autodiscover service. In some implementations, this may be achieved by identifying the type of client (e.g., type of application) an Autodiscover request is received from and modifying the type of response provided based on the type of client. This is because valid Autodiscover requests often originate from rich clients (e.g., known email clients such as Outlook, Outlook Mobile, Apple Mail and the like). As such, when a request is received from a known rich client, the Autodiscover service may provide a response that includes a redirect to a requested service endpoint. However, because requests originating from third-party applications such as web-browsers are open to security breaches, requests such as Hypertext Transfer Protocol (http) requests received from thin clients may be categorized as high risk. As a result, while Autodiscover services can be used by third-party applications, in order to minimize security threats, requests received from a thin client may result in a response that does not include a redirect to a service endpoint. In some implementations, the response provided is a non-standard response that causes the request to fail. Thus, the technical solution provides an efficient and easy to implement mechanism for increasing security of anonymous Autodiscover services.

As will be understood by persons of skill in the art upon reading this disclosure, benefits and advantages provided by such implementations can include, but are not limited to, increasing security and preventing phishing and other malicious attempts by unauthorized entities at exploiting an anonymous Autodiscover service utilized by messaging systems. Thus, the technical solution can significantly increase security of electronic messaging systems. This not only protects users from phishing and other security hacking attempts, but it can also protect enterprises from malicious access to their user email addresses and other sensitive information. The benefits provided by these technology-based solutions yield more 10 secure computer systems and communications.

The term "user" may refer to a person who utilizes a computing device. Furthermore, the term "anonymous" may refer to a service or request that can be performed without any authentication. As such, the term "anonymous Autodiscover service" may refer to an Autodiscover service that does not require user authentication and can be performed without confirmation of identity. The term "thin client" may refer to a web browser or other software program associated with internet browsing.

FIG. 1 illustrates an example system 100, upon which aspects of this disclosure may be implemented. The system 100 may include a client device 120 from which a request 126 for access to a resource and/or information may be transmitted. The request 126 may be a request for an Autodiscover service such as the Autodiscover service 132 offered by server 130. The request 126 may originate from a user agent 122 or it may come from an application 124. The user agent 122 may be a web browser, executing on the client device 120 that retrieves, renders and facilitates end-user interaction with web content. In some implementations, the user agent may be the client device's default web browser. The user agent 122 may be a known web browser (e.g., Internet Explorer, Microsoft® Edge, Mozilla® Firefox, and the like) or it may be a lesser-known web browser. The user agent 122 may be referred to herein as a thin client.

The application 124 may be a client application such as a mail application (e.g., Outlook) associated with a mail service (e.g., Microsoft Exchange). The application 124 may be referred to herein as a rich client. The application 124 may send a request 126 for configuration information and/or access to a resource such as a mail service. As such, the request 126 may be directed to specific endpoint URLs and may include at least a portion of the domain part of an email address. Such a request 126 may be directed to the Autodiscover service 132 to initiate an Autodiscover process. In an example, the request 126 may be directed to the Autodiscover service 132 to locate a mailbox or other associated mailbox information.

The request 126 may be in any form that facilitates successful completion of the Autodiscover process. For example, the request 126 may be sent using an HTTP post command, with an XML request within the HTTP post data requesting configuration information. In some examples, the request 126 may contain the user's email address, client device's IP address, services requester, and/or any other information that may be useful in enabling the Autodiscover server 130 to provide the requested services to the client device 120.

To enable communication with one or more servers, such as the server 130, the client device 120 may be connected to a network 170. The network 170 may be a wired or wireless network(s) or a combination of wired and wireless networks that connect one or more elements of the system 100. The client device 120 may be a personal or handheld computing device having or being connected to input/output elements that enable a user 140 to interact with content such as different applications and the user agent 122. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 3 and 4.

The system 100 may include a plurality of servers such as the Autodiscover server 130, a mail server 110, a directory server 150 and a client services server 160. Each of the servers 110, 130, 150 and 160 may operate as a shared resource server located at an enterprise accessible by various computer client devices such as client device 120. The servers may also operate as cloud-based servers for offering global services such as global mail and Autodiscover services. Each of the servers 110, 130, 150 and 160 may represent multiple servers for performing various different operations. Furthermore, one or more of the servers may be a part of any one of the other servers. In some implementations, the servers 110, 130, 150 and 160 may be back-end servers, and operate as a back-end server such as an enterprise email server. In an example, the email server is a Microsoft® Exchange server. The servers 110, 130, 150 and 160 may be located at one or more sites. In some implementations, one site may include each of the servers such as the mail server 110, Autodiscover server 130 and directory server 150.

The Autodiscover server 130 may include the Autodiscover service 132 for providing Autodiscover services to clients. For example, the Autodiscover server 130 may receive requests from clients for configuration information, process those requests via the Autodiscover service 132 and provide responses to the requests. In an example, the Autodiscover service 132 determines an endpoint for a specific mailbox based on an email address received in the Autodiscover request.

In some implementations, the Autodiscover service is an anonymous discovery service which does not require authentication. As discussed above, while such an anonymous service may have advantages for some users or enterprises, it can lead to a security loophole which may be exploited by malicious entities. To address this issue, the Autodiscover service 132 may include a mechanism for detecting the source from which an Autodiscover request originates. For example, the Autodiscover service 132 may include a logic for determining if a request originated from a thin client such as the user agent 122. Upon determining that the request 126 originated form a thin client, the Autodiscover service 132 may process the response provided differently. For example, instead of providing a redirection to a service endpoint URL, the Autodiscover service 132 may provide a non-standard response that causes the request 126 to fail.

In some implementations, upon receipt of an Autodiscover request, the Autodiscover server 132 identifies the specific URLs providing the service requested and generates a response with information on how to access the service endpoints. In some implementations, the Autodiscover service provides redirection to third party client services (not shown) which may be owned or operated by third parties. The third party services may be performed by third party servers that are located in separate sites or may be offered by servers that are located on-site which communicate with other equipment owned or managed by the organization operating the mail system.

The directory server 150 may include a directory service 152 for providing directory services, including storing and organizing information about network resources and devices connected to the system 100 such as mail servers and other client services servers (e.g., mail server 110, and 160). In some implementations, the directory server 150 includes network topology information. The mail server 110 may include a mail service 112 for providing electronic mail services for clients. Client services server 160 may provide other client services and is representative of various servers that may be part of an electronic communication system (e.g., electronic mail system). These services may include, but are not limited to, address book services, calendar services, instant messaging services, and availability services.

Figure 2:
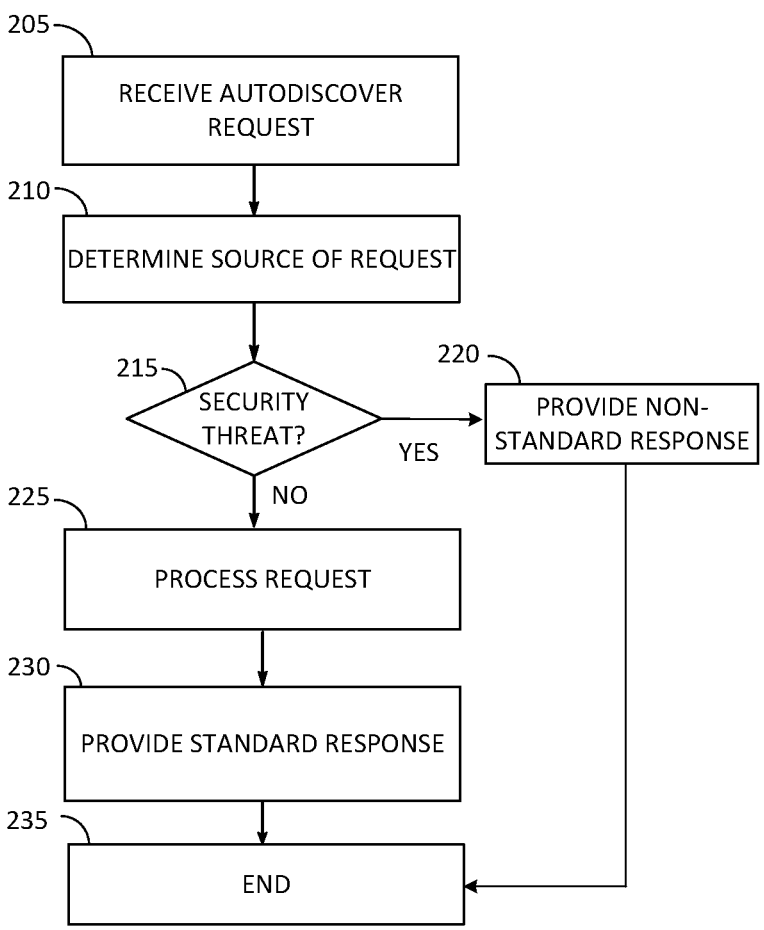
FIG. 2 is a flow diagram depicting an example method for providing security for anonymous Autodiscover services.

FIG. 2 is a flow diagram depicting an exemplary method 200 for curtailing potential exploitation of anonymous Autodiscover services. In an example, one or more steps of method 200 may be performed by an Autodiscover server (e.g., Autodiscover server 130 of FIG. 1) and/or an electronic mail system having an Autodiscover service (e.g., Autodiscover service 132 of FIG. 1). Other steps of method 200 may be performed by other servers.

At 205, method 200 may begin by receiving an Autodiscover request for access to a resource or access to configuration information (e.g., to configure a user's mailbox). The request may be received from a client device (e.g., client device 120 of FIG. 1) via a network. Within the client device, the request may originate from a rich client, such as an application (e.g., a mail client) or a thin client such a web browser. For example, clicking on a link in an email may result in invoking the default web browser of the client device, in which case an Autodiscover request is sent from the default web browser to the Autodiscover service for identifying the endpoint URL. Because most of the requests that pose security threats originate from thin clients such as web browsers, method 200 may proceed, at 210, to identify the source of the request.

In some implementations, determining the source of the request may be achieved by examining the request to determine the type of call from which it originated. For example, the request may be examined to determine if it conforms to a call received from a known user agent (e.g., known default web browser) or from an application that is built to launch a default web browser. In another example, the request may be examined to determine if it conforms to a format corresponding with an HTTP client that is not supported by the mail system (e.g., by system 100 of FIG. 1).

Once, the source of the request is identified, method 200 may proceed, at 215, to determine if the source falls within a range of sources that can potentially pose a security threat.

When it is determined that the source of the request falls within a range of sources that can pose a security threat (yes at 215), method 200 may proceed to provide a non-standard response, at 220. This may involve providing a response that does not include a URL to a service endpoint, as requested. For example, when the Autodiscover request includes a request for access to a service endpoint for which a normal response would include a URL redirect, the response provided may be a different HTTP status that does not include a redirect to the service endpoint. In an example, instead of providing a HTTP 302 redirect to a specific URL, the response may provide a HTTP 320 status code (or any other non-standard code) which is not a known HTTP response. Providing a HTTP status code such as a 3xx level status code as a response may be advantageous in that it enables a user (e.g., a human software developer) to determine the correct action to take, while preventing the browser from redirecting to a potentially malicious domain. Because the web browser does not identify the status code, the web browser may not know how to process the response. This may result in the blocking of the Autodiscover request process, thus causing the Autodiscover request to fail. This type of response prevents a potential redirection to a malicious domain. Furthermore, by not providing the requested mailbox information when the source is a thin client (e.g., a browser), potential validation of email addresses by malicious entities can be curtailed. Thus, the non-standard response significantly reduces security threats. After providing the non-standard response at 220, method 200 may proceed to end, at 235.

In cases when it is determined that the source of the request does not fall into categories that can pose a security threat (no at 215), method 200 may proceed to process the request in a normal manner, at 225. This may involve identifying the required information (e.g., mailbox configuration information) or a URL for the requested service endpoint. The identified information or URL may then be provided to the client device, at 230. This may involve transmitting an Autodiscover response that includes the requested information. The response may be referred to as a standard response as it conforms to standard Autodiscover responses. In an example, the response may include a URL for a requested service endpoint. For example, the response may include a HTTP 302 status code for redirection to a requested URL. Once the requested information is provided in a standard response, method 200 may proceed to end, at 235.

Thus, security for anonymous Autodiscover services may be increased and potential phishing or other malicious attacks may be prevented by identifying a source from which an Autodiscover request originates. When the source is a rich client (e.g., a mail client) in a client device, the response is processed in a normal manner, thus ensuring that normal processing of mail service proceeds as needed. When, however, the source is a thin client such as a user agent associated with known web browsers, the response may not include a redirection and/or information that can validate an email address. As a result, the Autodiscover service provides services only to rich clients that are associated with mail services and prevents malicious entities from exploiting the Autodiscover service. Because this process is performed by a back-end server such as the Autodiscover server, it does not require any client code changes. Furthermore, it does not require additional steps by a user. As a result, the methods and systems described herein provide an efficient and easy to implement mechanism for increasing security in electronic communications systems such as a mail system.

Figure 3:
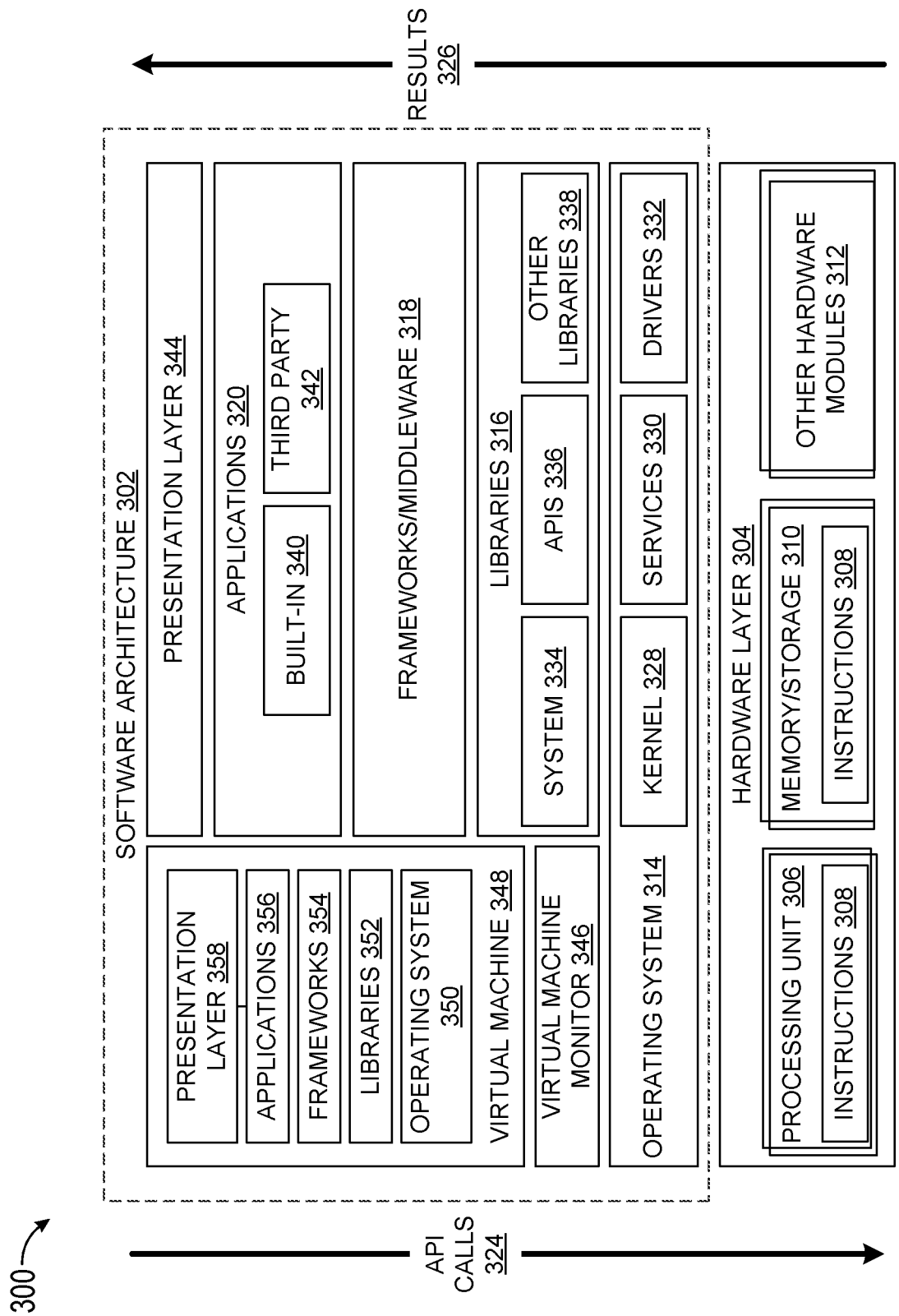
FIG. 3 is a block diagram illustrating an example software architecture, various portions of which may be used in conjunction with various hardware architectures herein described.

FIG. 3 is a block diagram 300 illustrating an example software architecture 302, various portions of which may be used in conjunction with various hardware architectures herein described, which may implement any of the above-described features. FIG. 3 is a non-limiting example of a software architecture and it will be appreciated that many other architectures may be implemented to facilitate the functionality described herein. The software architecture 302 may execute on hardware such as client devices, native application provider, web servers, server clusters, external services, and other servers. A representative hardware layer 304 includes a processing unit 306 and associated executable instructions 308. The executable instructions 308 represent executable instructions of the software architecture 302, including implementation of the methods, modules and so forth described herein.

The hardware layer 304 also includes a memory/storage 310, which also includes the executable instructions 308 and accompanying data. The hardware layer 304 may also include other hardware modules 312. Instructions 308 held by processing unit 308 may be portions of instructions 308 held by the memory/storage 310.

The example software architecture 302 may be conceptualized as layers, each providing various functionality. For example, the software architecture 302 may include layers and components such as an operating system (OS) 314, libraries 316, frameworks 318, applications 320, and a presentation layer 324. Operationally, the applications 320 and/or other components within the layers may invoke API calls 324 to other layers and receive corresponding results 326. The layers illustrated are representative in nature and other software architectures may include additional or different layers. For example, some mobile or special purpose operating systems may not provide the frameworks/middleware 318.

The OS 314 may manage hardware resources and provide common services. The OS 314 may include, for example, a kernel 328, services 330, and drivers 332. The kernel 328 may act as an abstraction layer between the hardware layer 304 and other software layers. For example, the kernel 328 may be responsible for memory management, processor management (for example, scheduling), component management, networking, security settings, and so on. The services 330 may provide other common services for the other software layers. The drivers 332 may be responsible for controlling or interfacing with the underlying hardware layer 304. For instance, the drivers 332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 316 may provide a common infrastructure that may be used by the applications 320 and/or other components and/or layers. The libraries 316 typically provide functionality for use by other software modules to perform tasks, rather than rather than interacting directly with the OS 314. The libraries 316 may include system libraries 334 (for example, C standard library) that may provide functions such as memory allocation, string manipulation, file operations. In addition, the libraries 316 may include API libraries 336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 316 may also include a wide variety of other libraries 338 to provide many functions for applications 320 and other software modules.

The frameworks 318 (also sometimes referred to as middleware) provide a higher-level common infrastructure that may be used by the applications 320 and/or other software modules. For example, the frameworks 318 may provide various GUI functions, high-level resource management, or high-level location services. The frameworks 318 may provide a broad spectrum of other APIs for applications 320 and/or other software modules.

The applications 320 include built-in applications 320 and/or third-party applications 322. Examples of built-in applications 320 may include, but are not limited to, a contacts application, a browser application, a location application, a media application, a messaging application, and/or a game application. Third-party applications 322 may include any applications developed by an entity other than the vendor of the particular system. The applications 320 may use functions available via OS 314, libraries 316, frameworks 318, and presentation layer 324 to create user interfaces to interact with users.

Some software architectures use virtual machines, as illustrated by a virtual machine 328. The virtual machine 328 provides an execution environment where applications/modules can execute as if they were executing on a hardware machine (such as the machine 400 of FIG. 4, for example). The virtual machine 328 may be hosted by a host OS (for example, OS 314) or hypervisor, and may have a virtual machine monitor 326 which manages operation of the virtual machine 328 and interoperation with the host operating system. A software architecture, which may be different from software architecture 302 outside of the virtual machine, executes within the virtual machine 328 such as an OS 350, libraries 352, frameworks 354, applications 356, and/or a presentation layer 358.

Figure 4:
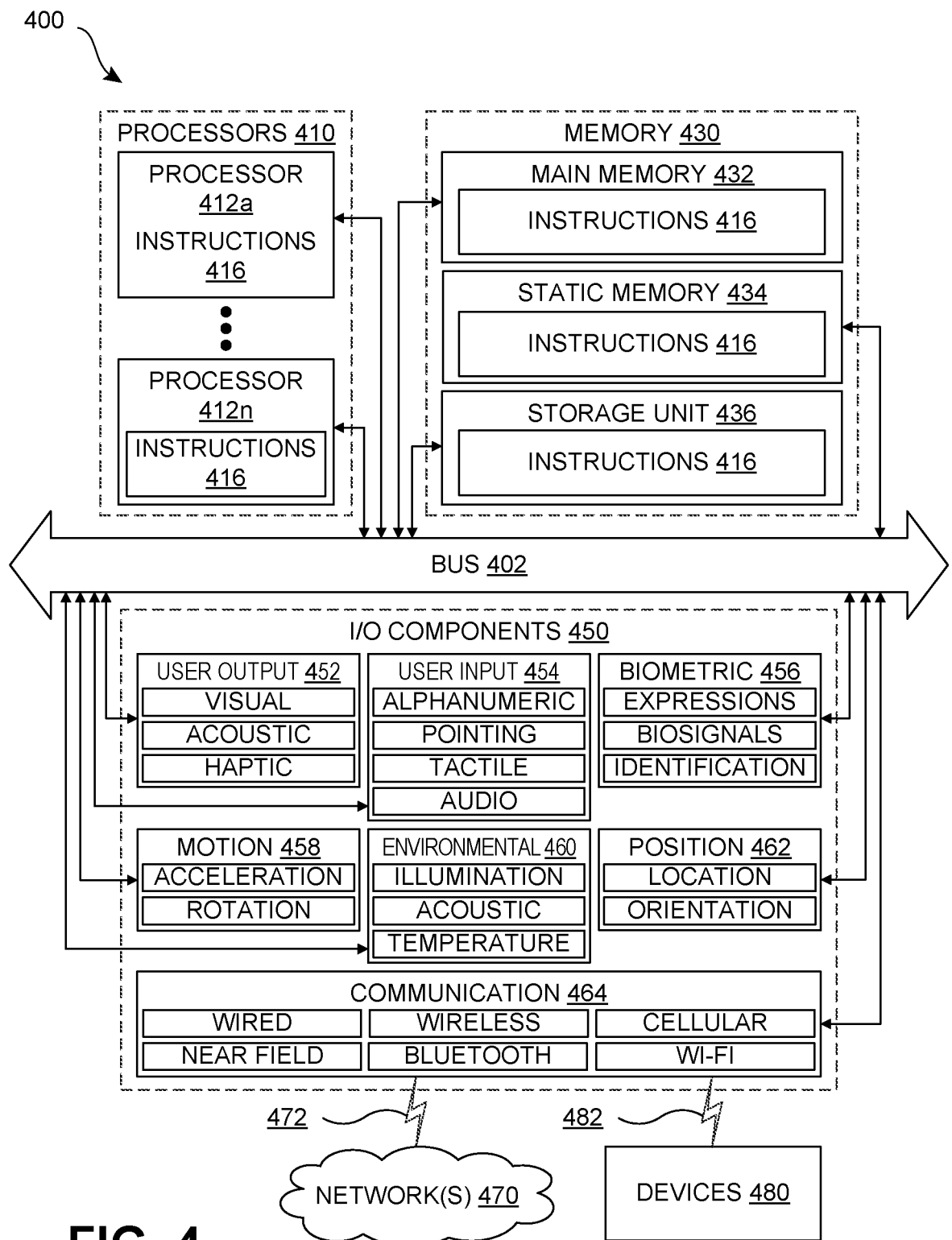
FIG. 4 is a block diagram illustrating components of an example machine configured to read instructions from a machine-readable medium and perform any of the features described herein.

FIG. 4 is a block diagram illustrating components of an example machine 400 configured to read instructions from a machine-readable medium (for example, a machine-readable storage medium) and perform any of the features described herein. The example machine 400 is in a form of a computer system, within which instructions 416 (for example, in the form of software components) for causing the machine 400 to perform any of the features described herein may be executed. As such, the instructions 416 may be used to implement methods or components described herein. The instructions 416 cause unprogrammed and/or unconfigured machine 400 to operate as a particular machine configured to carry out the described features. The machine 400 may be configured to operate as a standalone device or may be coupled (for example, networked) to other machines. In a networked deployment, the machine 400 may operate in the capacity of a server machine or a client machine in a server-client network environment, or as a node in a peer-to-peer or distributed network environment. Machine 400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 400 is illustrated, the term "machine" includes a collection of machines that individually or jointly execute the instructions 416.

The machine 400 may include processors 410, memory 430, and I/O components 450, which may be communicatively coupled via, for example, a bus 402. The bus 402 may include multiple buses coupling various elements of machine 400 via various bus technologies and protocols. In an example, the processors 410 (including, for example, a central processing unit (CPU), a graphics processing unit (GPU), a digital signal processor (DSP), an ASIC, or a suitable combination thereof) may include one or more processors 412a to 412n that may execute the instructions 416 and process data. In some examples, one or more processors 410 may execute instructions provided or identified by one or more other processors 410. The term "processor" includes a multi-core processor including cores that may execute instructions contemporaneously. Although FIG. 4 shows multiple processors, the machine 400 may include a single processor with a single core, a single processor with multiple cores (for example, a multi-core processor), multiple processors each with a single core, multiple processors each with multiple cores, or any combination thereof. In some examples, the machine 400 may include multiple processors distributed among multiple machines.

The memory/storage 430 may include a main memory 432, a static memory 434, or other memory, and a storage unit 436, both accessible to the processors 410 such as via the bus 402. The storage unit 436 and memory 432, 434 store instructions 416 embodying any one or more of the functions described herein. The memory/storage 430 may also store temporary, intermediate, and/or long-term data for processors 410. The instructions 414 may also reside, completely or partially, within the memory 432, 434, within the storage unit 436, within at least one of the processors 410 (for example, within a command buffer or cache memory), within memory at least one of I/O components 450, or any suitable combination thereof, during execution thereof. Accordingly, the memory 432, 434, the storage unit 436, memory in processors 410, and memory in I/O components 450 are examples of machine-readable media.

As used herein, "machine-readable medium" refers to a device able to temporarily or permanently store instructions and data that cause machine 400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 416) for execution by a machine 400 such that the instructions, when executed by one or more processors 410 of the machine 400, cause the machine 400 to perform and one or more of the features described herein. Accordingly, a "machine-readable medium" may refer to a single storage device, as well as "cloud-based" storage systems or storage networks that include multiple storage apparatus or devices.

The I/O components 450 may include a wide variety of hardware components adapted to receive input, provide output, produce output, transmit information, exchange information, capture measurements, and so on. The specific I/O components 450 included in a particular machine will depend on the type and/or function of the machine. For example, mobile devices such as mobile phones may include a touch input device, whereas a headless server or IoT device may not include such a touch input device. The particular examples of I/O components illustrated in FIG. 4 are in no way limiting, and other types of components may be included in machine 400. The grouping of I/O components 450 are merely for simplifying this discussion, and the grouping is in no way limiting. In various examples, the I/O components 450 may include user output components 452 and user input components 454. User output components 452 may include, for example, display components for displaying information (for example, a liquid crystal display (LCD) or a projector), acoustic components (for example, speakers), haptic components (for example, a vibratory motor or force-feedback device), and/or other signal generators. User input components 454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 450 may include biometric components 456 and/or position components 462, among a wide array of other environmental sensor components. The biometric components 456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 462 may include, for example, location sensors (for example, a Global Position System (GPS) receiver), altitude sensors (for example, an air pressure sensor from which altitude may be derived), and/or orientation sensors (for example, magnetometers).

The I/O components 450 may include communication components 464, implementing a wide variety of technologies operable to couple the machine 400 to network(s) 470 and/or device(s) 480 via respective communicative couplings 472 and 482. The communication components 464 may include one or more network interface components or other suitable devices to interface with the network(s) 470. The communication components 464 may include, for example, components adapted to provide wired communication, wireless communication, cellular communication, Near Field Communication (NFC), Bluetooth communication, Wi-Fi, and/or communication via other modalities. The device(s) 480 may include other machines or various peripheral devices (for example, coupled via USB).

In some examples, the communication components 464 may detect identifiers or include components adapted to detect identifiers. For example, the communication components 464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 462, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by the processor, cause the data processing system to perform functions of:
  receiving a request from a client device, the request being directed to an anonymous discovery service and the anonymous discovery service being a service that requires no authentication;
  identifying a source from which the request originated from within the client device; and
  responsive to the source being of a first type of sources, transmitting a first response to the client and responsive to the source being of a second type of sources transmitting a second response to the client, wherein:
the first response does not return a Uniform Resource Locator, URL, to a service endpoint, and
the second response returns a URL to a service endpoint.

Item 2. The data processing system of item 1, wherein the anonymous discovery service is associated with an electronic mail system.

Item 3. The data processing system of items 1 or 2, wherein the request requires a redirect to the service endpoint.

Item 4. The data processing system of any preceding item, wherein the second response includes a hypertext transfer protocol status code for redirection to the URL for the service endpoint.

Item 5. The data processing system of any preceding item, wherein identifying a source from which the request originated comprises examining the request to determine if the request originated from a hypertext transfer protocol client.

Item 6. The data processing system of any preceding item, wherein determining if the source is of the first type of sources includes determining if the request was received from a user agent associated with a known browser.

Item 7. The data processing system of item 6, wherein determining if the source is of the second type of sources includes determining if the request was received from an email client.

Item 8. A method for securing an anonymous discovery service, comprising:
receiving a request from a client device, the request being directed to the anonymous discovery service and the anonymous discovery service being a service that requires no authentication;
identifying a source from which the request originated from within the client device; and
responsive to the source being of a first type of sources, transmitting a first response to the client and responsive to the source being of a second type of sources transmitting a second response to the client,
wherein:
the first response does not return a Uniform Resource Locator, URL, to a service endpoint; and
the second response returns a URL to a service endpoint.

Item 9. The method of item 8, wherein the anonymous discovery service is associated with an electronic mail system.

Item 10. The method of items 8 or 9, wherein the request requires a redirect to the service endpoint.

Item 11. The method of any of items 8-10, wherein the second response includes a hypertext transfer protocol status code for redirection to the URL for the service endpoint.

Item 12. The method of any of items 8-11, wherein identifying a source from which the request originated comprises examining the request to determine if it originates from a hypertext transfer protocol status client.

Item 13. The method of any of items 8-12, wherein determining if the source is of the first type of sources includes determining if the request was received from a user agent associated with a known browser.

Item 14. The method of any of claims 8-13, wherein determining if the source is of the second type of sources includes determining if the request was received from an email client.

Item 15. A computer program that, when executed, causes a programmable device to carry out the method of any of items 8 to 14.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving an unauthenticated request by an autodiscover service from a client device for email configuration information for an email address;
identifying a source from which the unauthenticated request originated from within the client device; and
responsive to the source being a thin client, transmitting a first response to the client device and responsive to the source being a rich client, transmitting a second response to the client device,
wherein:
the first response causes the unauthenticated request to fail, and
the second response returns the email configuration information for the email address.

2. The data processing system of claim 1, wherein the autodiscover service is associated with an electronic mail system.

3. The data processing system of claim 1, wherein the unauthenticated request requires a redirect to a service endpoint.

4. The data processing system of claim 1, wherein the second response includes a hypertext transfer protocol status code for redirection to a URL for a service endpoint.

5. The data processing system of claim 1, wherein identifying a source from which the unauthenticated request originated further comprises examining the unauthenticated request to determine if the unauthenticated request originated from a hypertext transfer protocol client.

6. The data processing system of claim 1, wherein identifying a source from which the unauthenticated request originated further comprises determining if the unauthenticated request was received from an email client.

7. A method for securing an anonymous discovery service, comprising:
receiving an unauthenticated request by an autodiscover service from a client device for email configuration information for an email address;
identifying a source from which the unauthenticated request originated from within the client device; and
responsive to the source being a thin client, transmitting a first response to the client device and responsive to the source being a rich client, transmitting a second response to the client device,
wherein:
the first response causes the unauthenticated request to fail, and
the second response returns the email configuration information for the email address.

8. The method of claim 7, wherein the autodiscover service is associated with an electronic mail system.

9. The method of claim 7, wherein the unauthenticated request requires a redirect to a service endpoint.

10. The method of claim 7, wherein the second response includes a hypertext transfer protocol status code for redirection to a URL for a service endpoint.

11. The method of claim 7, wherein identifying a source from which the unauthenticated request originated further comprises examining the unauthenticated request to determine if it originates from a hypertext transfer protocol status client.

12. The method of claim 7, wherein identifying a source from which the unauthenticated request originated further comprises determining if the unauthenticated request was received from an email client.

13. A non-transitory computer readable medium on which are stored instructions that, when executed, cause a programmable device to perform functions of:
receiving an unauthenticated request by an autodiscover service from a client device for email configuration information for an email address;
identifying a source from which the unauthenticated request originated from within the client device; and
responsive to the source being a thin client, transmitting a first response to the client device and responsive to the source being a rich client, transmitting a second response to the client device,
wherein:
the first response causes the unauthenticated request to fail, and
the second response returns the email configuration information for the email address.

14. The non-transitory computer readable medium of claim 13, wherein the autodiscover service is associated with an electronic mail system.

15. The non-transitory computer readable medium of claim 13, wherein the unauthenticated request requires a redirect to a service endpoint.

16. The non-transitory computer readable medium of claim 13, wherein the second response includes a hypertext transfer protocol status code for redirection to a URL for a service endpoint.

17. The non-transitory computer readable medium of claim 13, wherein identifying a source from which the unauthenticated request originated further comprises examining the unauthenticated request to determine if it originates from a hypertext transfer protocol status client.

18. The non-transitory computer readable medium of claim 13, wherein identifying a source from which the unauthenticated request originated further comprises determining if the unauthenticated request was received from an email client.

* * * * *